March 15, 1932.  V. VALLETTA  1,850,041

VARIABLE SPEED GEARING, PARTICULARLY FOR MOTOR VEHICLES

Original Filed Nov. 19, 1929

Inventor,
Vittorio Valletta,
By Henry Orth Jr.
Atty.

Patented Mar. 15, 1932

1,850,041

UNITED STATES PATENT OFFICE

VITTORIO VALLETTA, OF TURIN, ITALY, ASSIGNOR TO FIAT SOCIETA ANONIMA, OF TURIN, ITALY

VARIABLE SPEED GEARING, PARTICULARLY FOR MOTOR VEHICLES

Original application filed November 19, 1929, Serial No. 408,293, and in Italy December 12, 1928. Divided and this application filed September 18, 1930. Serial No. 482,840.

This invention refers to a change speed gearing and has for its object improvements in my invention described in the United States Patent No. 1,794,264 granted February 24, 1931, of which this application is a division.

The variable speed gearing is similar in general construction to that described in said specification, i. e. the next lower speed to the direct drive (or third gear) is obtained through the medium of two eccentric gear sets with internal and external sets of teeth, respectively, while the lower speeds are obtained by means of axially slidable gear sets. The usual pinions connecting the engine shaft with the countershaft are driven by the engine shaft under speed reduction through the two eccentric gear sets for the third speed, and in the total transmission ratio from the engine shaft to the countershaft this reduction is added to that effected by the pair of pinions actuating the countershaft.

The purpose of the present invention is essentially to simplify construction and to increase at the same time the strength of the gearing while facilitating the operation of dismounting its parts.

A further object of this invention is to provide a variable speed gearing, wherein the gearing members are supported by bush bearings, means being provided for greasing said bush bearings through a forced circulation of an oil lubricant.

A still further object of the invention is to provide a variable speed gearing, wherein the movable gear set for the first and second speeds slides by means of teeth on the sleeve controlling the third and fourth speeds, which sleeve is slidably keyed in turn on an extension of the transmission shaft.

The accompanying drawings show, by way of example, a construction of the variable speed gearing according to the invention.

Figure 1:
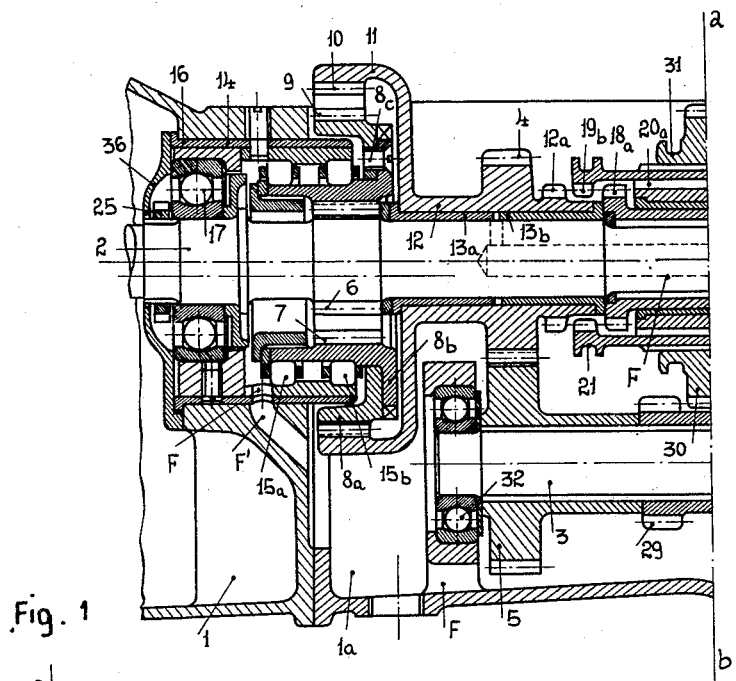
Fig. 1 is a vertical longitudinal section through the gearing which is shown in two parts for convenience.
Figure 2:
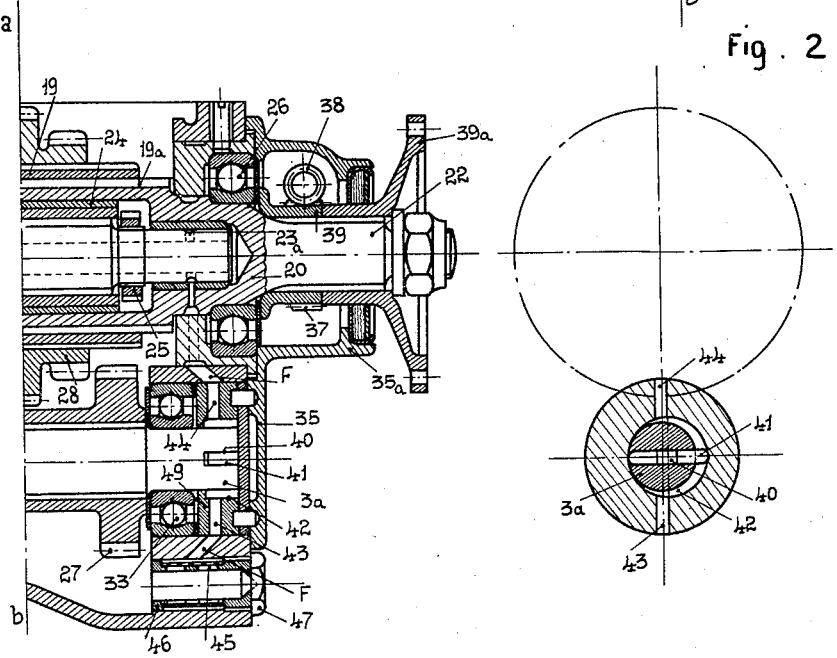
Fig. 2 is a partial cross section showing the oil pump.

The gearbox is divided vertically into two parts 1 and 1a connected together in any suitable manner permitting rapid and easy dismounting of the various gearing members. On the engine shaft 2 are teeth 6 meshing with the internal set of teeth 7 of the C-section ring which is made in two parts 8a: 8b joined by screws 8c. The part 8a carries the internal set of teeth 7 and the part 8b is provided with teeth 9 meshing with the internal set of teeth 10 of the crown 11 having the hub 12.

The pinions 7 and 9 of the ring 8a:8b are eccentrically disposed with respect to the axis of the engine shaft 2 and are supported by a suport 14 also eccentric to the said axis and held in a corresponding recess in the gearbox. In the support 14 is fitted a sleeve 16 with an eccentric extension supporting a ball bearing 17 for the engine shaft 2. The support 14 reaches into the annular hollow of the C-section ring 8a:8b and supports the ring through two roller bearings 15a and 15b, this latter being exactly in the middle plane of the pinions 6:7 and 9:10 of which it absorbs the reaction. The shaft 2 carries within the hub 12 a large bearing preferably divided into two parts 13a and 13b, on which the hub 12 turns with the integral pinion 4 and set of external teeth 12a. The pinion 4 meshes with the corresponding pinion 5 keyed on the countershaft 3.

The engine shaft 2 reaches within the bell 20 of the transmission shaft 22. Between the corresponding ends of the shaft 2 and bell 20 are interposed bush bearings 23a and 24. The ball bearing 26 fast with the box 1a serves for supporting the transmission shaft 22. The bell-shaped end 20 of the shaft 22 has external feathers or teeth 20a meshing with a corresponding internal set of teeth 19a cut in the longitudinally slidable sleeve 19. This latter is provided at one end with an internal set of teeth 19b adapted to mesh either with the teeth 12a (for the third speed) or with teeth 18a on a sleeve fast with the engine shaft 2 (for direct drive). A fork engages the recess 21 at one end of the sleeve 19 for effecting longitudinal displacement of the sleeve.

The sleeve 19 has outer feathers or teeth on which slide the rigidly coupled gears 30 and 28 (for first and second speed, respectively) under the action of a fork engaging the collar 31.

On the countershaft 3 are rigidly keyed the pinions 29 and 27 meshing with the pinions 30 and 28, respectively. In this construction the gears 4 and 5 are spur wheels and the countershaft 3 is supported by the two ball bearings 32 and 33 without any thrust bearing.

The countershaft 3 extends beyond the ball bearing 33 and forms the rotating hub 3a of a vane pump for oil circulation. Said hub 3a has a cross slit 40 in which two vanes 41 are movable and serve to compress the oil in an eccentric chamber 42 formed in a body 49 attached to the end of the casing 1. An oil inlet 43 and an oil outlet 44 are provided in the walls of the chamber 42. Before reaching the pump, the oil is caused to flow through a filter 45 preferably consisting of a perforated sleeve 46 surrounded by a wire gauze, the outer end of which is screw-threaded and provided with a nut 47 for screwing it on the lower end of the box 1a.

The oil flowing under pressure from the vane pump circulates through openings or channels F formed in the various stationary and rotating members, thereby ensuring a continuous flow of oil to the essential parts, such as the bearings and the gears. The oil flows through the aforesaid openings into the engine shaft 2, then through holes to the bush bearings and to the third speed gears, then through ports in the member 14 to a cross conduit F' in the casing wall from which it falls on the bottom of the gearbox 1a where it cools before being returned to the pump.

The various members mounted on the engine shaft are held against shoulders on the shaft by means of clamp rings 25, and covers 35 and 36 protect the lower portion of the gearbox 1a and the bearing 17, respectively. The cover 35 carries the case 35a for the worm gear 37:38 operating the speedometer.

The sleeve 39 mounted on the transmission shaft 22 is divided in two parts and besides carrying the wheel 37 is provided with a flange 39a for coupling with the transmission of the vehicle.

What I claim is:

1. In a variable speed gearing, in combination; a gearbox, a driving shaft, said shaft having an axial bore, a pinion on said shaft entering said gearbox, a driven shaft coaxially arranged to said driving shaft and having one bell shaped end, cylindrical bearings in said bell supporting said driving shaft, a C-shaped ring with external and internal teeth fitted in said gearbox eccentrically to the driving shaft and meshing internally with the pinion on the driving shaft, a sleeve provided with a cylindrical bearing by means of which the sleeve is supported by said driving shaft, said sleeve having an inner set of teeth meshing with the external teeth of the said C-shaped ring, a secondary shaft, gears connecting said secondary shaft and said sleeve and means controlled by said secondary shaft to feed lubricating oil to said cylindrical bearings through the axial bore of said driving shaft.

2. In a change-speed mechanism, in combination; a gearbox, a driving shaft having an axial bore and entering said gearbox, a driven shaft co-axial to said driving shaft and having one of its ends in the shape of a bell, cylindrical bearings in said bell supporting said driving shaft, a C-shaped ring with external and internal teeth fitted in said gearbox eccentrically to said driving shaft and meshing internally with a pinion on the driving shaft, a sleeve supported by said driving shaft by means of a cylindrical bearing and having an inner set of teeth meshing with the external teeth of said C-shaped ring, a secondary shaft, gears connecting said secondary shaft to said sleeve, a vane pump fitted in the gearbox wall and operated by said secondary shaft to draw in the lubricating oil from the bottom of said gearbox and force it into said cylindrical bearings through the axial bore and radial holes of said driving shaft.

In testimony that I claim the foregoing as my invention, I have signed my name.

VITTORIO VALLETTA.